United States Patent [19]

Eckstein et al.

[11] 4,326,066
[45] Apr. 20, 1982

[54] TRIAZOLYL COUMARIN COMPOUNDS, PROCESSES FOR THEIR PREPARATION AND THEIR USE AS WHITENERS AND LASER DYESTUFFS

[75] Inventors: Udo Eckstein, Cologne; Roderich Raue, Leverkusen; Carl-Wolfgang Schellhammer, Berg.-Gladbach all of Fed. Rep. of Germany

[73] Assignee: Bayer Aktiengesellschaft, Leverkusen, Fed. Rep. of Germany

[21] Appl. No.: 109,957

[22] Filed: Jan. 7, 1980

[30] Foreign Application Priority Data

Jan. 23, 1979 [DE] Fed. Rep. of Germany ....... 2902470

[51] Int. Cl.³ .................. C07D 405/4; C07D 405/10; C07D 413/14; C09K 9/02
[52] U.S. Cl. .............................. 548/256; 252/301.17; 252/301.29; 260/141; 260/152; 260/245.5; 260/343.44; 542/458; 544/132; 544/158; 544/196; 544/366; 546/196; 560/11; 560/125; 560/149; 564/258
[58] Field of Search .......................... 548/256; 542/458

[56] References Cited

U.S. PATENT DOCUMENTS

| | | | |
|---|---|---|---|
| 3,636,004 | 1/1972 | Bode et al. | 548/256 |
| 3,784,570 | 1/1974 | Schellhammer | 548/256 |
| 3,839,351 | 10/1974 | Dorlars et al. | 548/256 |
| 3,925,405 | 12/1975 | Boehmke et al. | 548/256 |
| 3,975,291 | 8/1976 | Claussen et al. | 548/256 |
| 4,069,228 | 1/1978 | Schellhammer et al. | 548/256 |

FOREIGN PATENT DOCUMENTS 4817626 5/1973 Japan ................... 548/374

OTHER PUBLICATIONS

Okubo et al., Chemical Abstracts, vol. 75, Abstract No. 7452f(1971).

*Primary Examiner*—Alton D. Rollins
*Attorney, Agent, or Firm*—Sprung, Felfe, Horn, Lynch & Kramer

[57] ABSTRACT

Coumarin compounds of the formula

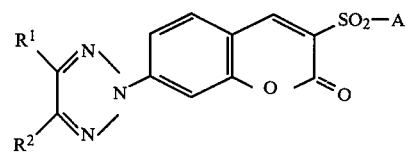

in which
the substituents have the meanings given in
the description,
are valuable whiteners for natural fibre materials, such as wool, or synthetic polycondensates. They can also be used as scintillators and laser dyestuffs.

2 Claims, No Drawings

TRIAZOLYL COUMARIN COMPOUNDS, PROCESSES FOR THEIR PREPARATION AND THEIR USE AS WHITENERS AND LASER DYESTUFFS

The present invention relates to new coumarins which are substituted in the 3-position by sulphonyl, processes for their preparation and their use as whiteners and laser dyestuffs.

The new compounds have the formula

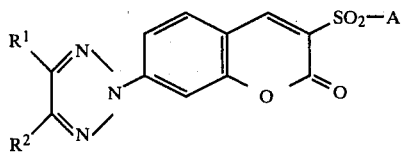   I wherein
A represents alkyl, aralkyl, alkenyl, cycloalkyl, aryl or a radical of the formula $-OR^3$ or $-NHR^4$,
$R^1$ denotes hydrogen, halogen, alkyl, aralkyl, alkoxy, aralkoxy, alkoxycarbonyl, cyano or aryl or, together with $R^2$, a fused-on benzene system or naphthalene system,
$R^2$ denotes hydrogen, alkyl, aralkyl, halogen, alkoxy, aralkoxy, alkoxycarbonyl, cyano, aryl or styryl or, together with $R^1$, a fused-on benzene system or naphthalene system,
$R^3$ denotes hydrogen, alkyl, aralkyl or aryl and
$R^4$ denotes alkyl, aralkyl, cycloalkyl or aryl,
but $R^1$ and $R^2$ cannot simultaneously represent hydrogen, and wherein the cyclic and acyclic radicals can carry non-chromophoric substituents usual in whiteners.

Examples of non-chromophoric substituents are halogen, optionally substituted alkyl, optionally substituted alkenyl, aryl, aralkyl, optionally substituted alkoxy, alkoxycarbonyl, optionally substituted aminocarbonyl, cyano, sulpho, optionally substituted aminosulphonyl, acyl, acylamino, hydroxyl, aryloxy, aralkoxy, alkenyloxy, carboxyl or acyloxy.

The sulphonic acid groups can be in the form of either the free acids or of salts, and water-soluble salts, such as alkali metal salts and optionally substituted ammonium salts, are particularly preferred.

Alkyl is, in particular, $C_1$- to $C_4$-alkyl, which can be substituted by hydroxyl, $C_1$- to $C_4$-hydroxy, cyano, carboxyl, $C_1$- to $C_4$-alkoxycarbonyl, aminocarbonyl, chlorine, bromine or a radical of the formula

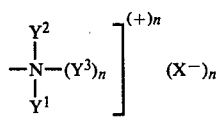

wherein
$Y^1$ denotes hydrogen, $C_1$- to $C_4$-alkyl, benzyl or phenyl or, together with $Y^2$ and the nitrogen atom, morpholino, piperidino, piperazino, pyrrolidino or hexamethyleneimino,
$Y^2$ denotes hydrogen, amino, $C_1$- to $C_4$-alkyl, benzyl or phenyl or, together with $Y^1$ and the nitrogen atom, morpholino, piperidino, piperazino, pyrrolidino or hexamethyleneimino,
$Y^3$ denotes $C_1$- to $C_4$-alkyl, $C_2$- to $C_4$-alkenyl or phenyl-$C_1$- to -$C_3$-alkyl, optionally substituted by hydroxyl,
n denotes 0 or 1 and
X can represent a colourless acid radical.

Cycloalkyl is, in particular, cyclopentyl or cyclohexyl.

Alkenyl is, in particular, $C_2$- to $C_4$-alkenyl, which can be monosubstituted by hydroxyl, $C_1$- to $C_4$-alkoxy, cyano, carboxyl, $C_1$- to $C_4$-alkoxycarbonyl, chlorine or bromine. Vinyl and allyl are preferred.

Halogen is, in particular, fluorine, chlorine or bromine, preferably chlorine.

Aryl is, in particular, phenyl which is optionally mono-, di- or tri-substituted by $C_1$- to $C_4$-alkyl, trifluoromethyl, chlorine, bromine, carboxyl, cyano, $C_1$- to $C_4$-alkoxycarbonyl or $C_1$- to $C_4$-alkoxy.

Aralkyl is, in particular, phenyl-$C_1$- to -$C_4$-alkyl, which can be further substituted in the phenyl nucleus by chlorine, methyl or methoxy.

Alkoxy is, in particular, $C_1$- to $C_4$-alkoxy or a radical of the formula

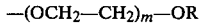

wherein
R denotes hydrogen or $C_1$- to $C_4$-alkyl and
m denotes an integer from 1 to 20.

Acyl is, in particular, $C_1$- to $C_4$-alkylcarbonyl, $C_1$- to $C_4$-alkoxycarbonyl or benzoyl which is optionally substituted by methyl, methoxy or chlorine.

Alkoxycarbonyl is, in particular, $C_1$- to $C_4$-alkoxycarbonyl which is optionally substituted by hydroxyl, halogen or cyano.

Preferred compounds of the general formula I have the formula

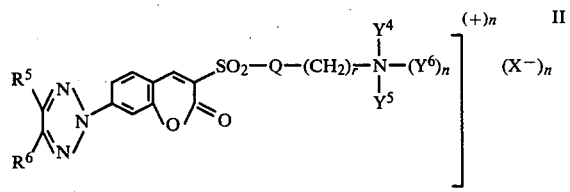   II wherein
Q denotes NH or a direct bond,
$R^5$ denotes hydrogen, chlorine, $C_1$- to $C_4$-alkyl, $C_1$- to $C_4$-alkoxy, $C_1$- to $C_4$-alkoxycarbonyl, cyano, phenyl which is optionally substituted by $C_1$- to $C_4$-alkyl, $C_1$- to $C_4$-alkoxy or chlorine, or styryl,
$R^6$ denotes $C_1$- to $C_4$-alkyl, $C_1$- to $C_4$-alkoxy, phenyl which is optionally substituted by $C_1$- to $C_4$-alkyl, $C_1$- to $C_4$-alkoxy or chlorine, or styryl,
$Y^4$ denotes hydrogen, $C_1$- to $C_4$-alkyl, benzyl or phenyl or, together with $Y^5$ and the nitrogen atom, morpholino or piperidino,
$Y^5$ denotes hydrogen, $C_1$- to $C_4$-alkyl, benzyl, phenyl or, together with $Y^4$ and the nitrogen atom, morpholino or piperidino,
$Y^6$ denotes $C_1$- to $C_4$-alkyl, $C_2$- to $C_4$-alkenyl or benzyl,
n denotes 0 or 1,
r denotes 1 to 4 and
X denotes a colourless acid radical.

Another preferred group of compounds have the formula

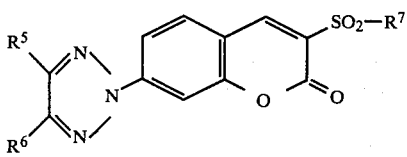

wherein
$R^7$ denotes hydroxyl, $C_1$- to $C_4$-alkyl which is optionally substituted by hydroxyl, chlorine, cyano, sulpho or $C_1$- to $C_4$-alkoxy, benzyl, $C_2$- to $C_4$-alkenyl or phenyl, naphthyl or biphenyl optionally mono-, di- or tri-substituted by chlorine, $C_1$- to $C_4$-alkyl or $C_1$- to $C_4$-alkoxy and
$R^5$ and $R^6$ have the abovementioned meaning, and the sulphonic acid group can be in the form of a salt.

The compounds of the formula

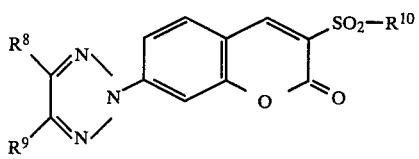

wherein
$R^8$ denotes hydrogen, chlorine, $C_1$- to $C_4$-alkyl or phenyl which is optionally substituted by $C_1$- to $C_4$-alkyl, $C_1$- to $C_4$-alkoxy or chlorine,
$R^9$ denotes $C_1$- to $C_4$-alkyl, $C_1$- to $C_4$-alkoxy or phenyl which is optionally substituted by $C_1$- to $C_4$-alkyl, $C_1$- to $C_4$-alkoxy or chlorine and
$R^{10}$ denotes hydroxyl, $C_1$- to $C_4$-alkyl which is optionally substituted by hydroxyl, chlorine, cyano, sulpho or $C_1$- to $C_4$-alkoxy, benzyl, $C_2$- to $C_4$-alkenyl or phenyl or biphenylyl, optionally mono- or di-substituted by chlorine, $C_1$- to $C_4$-alkyl or $C_1$- to $C_4$-alkoxy,
and the sulphonic acid group can also be in the form of a salt, are of particular importance industrially.

Coumarin derivatives of the formula I can be prepared by methods which are known per se, in which 4-[1',2',3'-triazol-2'-yl]-salicylaldehyde of the formula

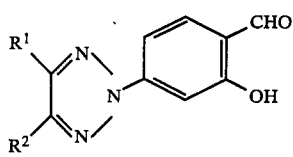

wherein
$R^1$ and $R^2$ have the same meaning as in formula I, are subjected to condensation reactions with substituted acetic acid esters of the formula

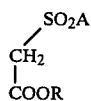

wherein
A has the meaning given in the case of formula I and
R represents $C_1$- to $C_4$-alkyl,
in the presence of basic catalysts.

Another suitable process for the preparation of coumarin compounds of the formula I consists of a procedure in which triazolylsalicylaldehydes of the formula V are subjected to condensation reactions with substituted acetic acids of the formula

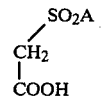

wherein
A has the meaning given in the case of formula I, in the presence of sodium acetate and acetic anhydride.

The coumarin compounds of the formula I can also be prepared by a procedure in which 7-hydrazinocoumarin derivatives of the formula

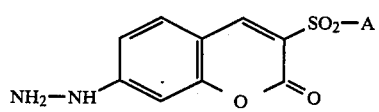

wherein
A has the meaning given in the case of formula I, are subjected to condensation reactions with α-nitrosoketones of the formula

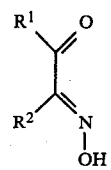

wherein
$R^1$ and $R^2$ have the meaning given in the case of formula I,
to give compounds of the formula

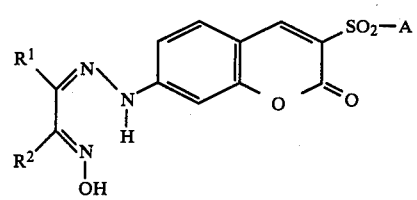

which are then cyclised.

An equally advantageous process for the preparation of coumarin compounds of the formula I consists of a procedure in which aromatic amines of the formula

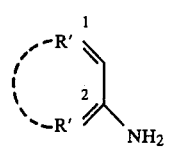

wherein
$R'^1$ and $R'^2$ together denote an optionally substituted benzene system or naphthalene system,
are coupled to 7-diazonium salts of the formula

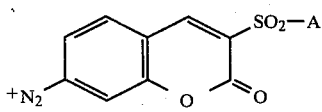

wherein
A has the same meaning as in formula I,
to give compounds of the formula

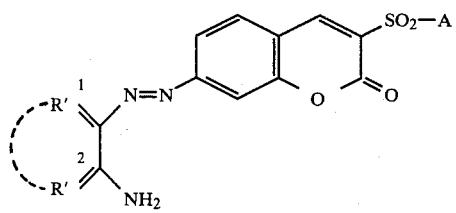

and these are then subjected to dehydrogenation and cyclisation by heating in the presence of Cu-II salts.

The starting compounds of the formulae V, VI, VII, VIII, X and XI are known from the literature, or they can be prepared by processes analogous to those in the literature (compare, for example, Japanese Patent Application No. 73/17626).

Examples of suitable compounds of the formula V are: 4-(4′-phenyl-1′,2′,3′-triazol-2′-yl)-salicylaldehyde, 4-(4′-phenyl-5′-methyl-1′,2′,3′-triazol-2′-yl)-salicylaldehyde, 4-(4′-methyl-5′-ethyl-1′,2′,3′-triazol-2′-yl)-salicylaldehyde, 4-(4′,5′-dimethyl-1′,2′,3′-triazol-2′-yl)-salicylaldehyde, 4-(4′-biphenylyl-5′-methyl-1′,2′,3′-triazol-2′-yl)-salicylaldehyde, 4-(4′-styryl-1′,2′,3′-triazol-2′-yl)-salicylaldehyde, 4-(4′-chloro-5′-phenyl-1′,2′,3′-triazol-2′-yl)-salicylaldehyde, 4-(4′-methyl-5′-butyl-1′,2′,3′-triazol-2′-yl)-salicylaldehyde, 4-(4′-chloro-5′-methyl-1′,2′,3′-triazol-2′-yl)-salicylaldehyde, 4-(4′-methoxy-1′,2′,3′-triazol-2′-yl)-salicylaldehyde, 4-(4′-methyl-5′-butoxy-1′,2′,3′-triazol-2′-yl)-salicylaldehyde, 4-(4′-methyl-5′-carbethoxy-1′,2′,3′-triazol-2′-yl)-salicylaldehyde, 4-(4′-phenyl-5′-cyano-1′,2′,3′-triazol-2′-yl)-salicylaldehyde, 4-(4-′-ethyl-5′-phenyl-1′,2′,3′-triazol-2′-yl)-salicylaldehyde and 4(4′-chloro-5′-phenyl-1′,2′,3′-triazol-2′-yl)-salicylaldehyde.

Examples of suitable compounds of the formula VI are: ethyl methylsulphonylacetate, ethyl ethylsulphonylacetate, ethyl n-butylsulphonylacetate, ethyl isopropylsulphonylacetate, ethyl 2-hydroxyethylsulphonylacetate, ethyl 2-cyanoethylsulphonylacetate, ethyl 2-methoxyethylsulphonylacetate, ethyl 4-methoxybutylsulphonylacetate, ethyl 2-chloroethylsulphonylacetate, ethyl 2-propenylsulphonylacetate, ethyl 2-ethoxyethylsulphonylacetate, ethyl 3-chloropropylsulphonylacetate, ethyl 4-chlorobutylsulphonylacetate, ethyl 2-aminoethylsulphonylacetate, ethyl 3-diethylaminopropylsulphonylacetate, ethyl 3-morpholinopropylsulphonylacetate, ethyl 2-methylaminoethylsulphonylacetate, ethyl phenylaminomethylsulphonylacetate, ethyl phenylsulphonylacetate, ethyl 4-methylphenylsulphonylacetate, ethyl 4-chlorophenylsulphonylacetate, ethyl 3,4-dichlorophenylsulphonylacetate, ethyl 2,5-dichlorophenylsulphonylacetate, ethyl 4-ethylphenylsulphonylacetate, ethyl 2-chlorophenylsulphonylacetate, ethyl 3-chlorophenylsulphonylacetate, ethyl benzylsulphonylacetate, ethyl 4-biphenylsulphonylacetate, ethyl 4-methoxyphenylsulphonylacetate, ethyl 3-ethoxyphenylsulphonylacetate, ethyl 2-chloro-4-methoxyphenylsulphonylacetate and ethyl 3-chloro-4-methoxyphenylsulphonylacetate.

Examples of suitable compounds of the formula VIa are: 2-sulphoethylsulphonylacetic acid, 2-sulphopropylsulphonylacetic acid and sulphoacetic acid.

Examples of suitable compounds of the formula VII are: 3-methylsulphonyl-7-hydrazinocoumarin, 3-ethylsulphonyl-7-hydrazinocoumarin, 3-(n-butylsulphonyl)-7-hydrazinocoumarin, 3-isopropylsulphonyl-7-hydrazinocoumarin, 3-(2′-hydroxyethyl)-7-hydrazinocoumarin, 3-(2′-cyanoethylsulphonyl)-7-hydrazinocoumarin, 3-(2′-methoxyethylsulphonyl)-7-hydrazinocoumarin, 3-(4′-methoxybutylsulphonyl)-7-hydrazinocoumarin, 3-(2′-chloroethylsulphonyl)-7-hydrazinocoumarin, 3-(2′-propenylsulphonyl)-7-hydrazinocoumarin, 3-(2′-ethoxyethylsulphonyl)-7-hydrazinocoumarin, 3-(3′-chloropropylsulphonyl)-7-hydrazinocoumarin, 3-(4′-chlorobutylsulphonyl)-7-hydrazinocoumarin, 3-(2′-aminoethylsulphonyl)-7-hydrazinocoumarin, 3-(3′-diethylaminopropylsulphonyl)-7-hydrazinocoumarin, 3-(3′-morpholinopropylsulphonyl)-7-hydrazinocoumarin, 3-(2′-methylaminoethylsulphonyl)-7-hydrazinocoumarin, 3-phenylaminomethylsulphonyl-7-hydrazinocoumarin, 3-(2′-sulphoethylsulphonyl)-7-hydrazinocoumarin, 3-(2′-sulphopropylsulphonyl)-7-hydrazinocoumarin, 3-sulphonyl-7-hydrazinocoumarin, 3-phenylsulphonyl-7-hydrazinocoumarin, 3-(4′-methylphenylsulphonyl)7-hydrazinocoumarin, 3-(4′-chlorophenylsulphonyl)-7-hydrazinocoumarin, 3-(3′,4′-dichlorophenylsulphonyl)-7-hydrazinocoumarin, 3-(2′,5′-dichlorophenylsulphonyl)-7-hydrazinocoumarin, 3-(4′-ethylphenylsulphonyl)-7-hydrazinocoumarin, 3-(2′-chlorophenylsulphonyl)-7-hydrazinocoumarin, 3-benzylsulphonyl-7-hydrazinocoumarin, 3-(4′-biphenylsulphonyl)-7-hydrazinocoumarin, 3-(4′-methoxyphenylsulphonyl)-7-hydrazinocoumarin, 3-(3′-ethoxyphenylsulphonyl)-7-hydrazinocoumarin, 3-(2′-chloro-4′-methoxyphenylsulphonyl)-7-hydrazinocoumarin and 3-(3′-chloro-4′-methylphenylsulphonyl)-7-hydrazinocoumarin.

Examples of suitable compounds of the formula VIII are: 2,3-pentanedione 2-oxime, 1-phenyl-1,2-propanedione 2-oxime, 1,2-butanedione 1-oxime, 1-phenyl-1,2-ethanedione 2-oxime, 2,3-heptanedione 2-oxime, ethyl 3-phenyl-2-oxy-3-hydroxyimino-propionate, 4-phenyl-1,2-but-3-enedione 1-oxime and 2,3-butanedione 2-oxime.

Examples of suitable compounds of the formula X are: 2-naphthylamine-1-sulphonic acid, 4-amino-2-methoxy-1-methylbenzene, 3-amino-6-methoxy-1-methylbenzene, 4-amino-2-ethoxy-1-methylbenzene, 3-amino-6-ethoxy-1-methylbenzene, 4-amino-2-n-butoxybenzene, 4-amino-2-isopropoxy-1-methylbenzene, 4-amino-2-sec.-butoxy-1-methylbenzene, glycol monoethyl mono-(2-methyl-5-amino)-phenyl ether, 4-amino-2-isoamyloxy-1-methylbenzene, 4-amino-2-chloro-1-methylbenzene, 4-amino-1,2-dichlorobenzene, 4-amino-2-chloro-1-ethylbenzene and 4-amino-2-methoxy-1-chlorobenzene.

Substituents can also be introduced into the coumarin compounds afterwards, for example by reacting the coumarin compounds with bromine in glacial acetic acid or sulphuric acid or, to introduce a sulphonic acid group, by reacting them with oleum.

Because of their absorption in the ultraviolet range and their fluorescence, the compounds according to the invention are suitable for whitening the most diverse synthetic, semi-synthetic and natural organic high-molecular materials.

Coumarin compounds of the type according to the invention which contain an acid group, especially a sulphonic acid group, can be used in particular for brightening natural fibre materials, for example wool, whilst coumarin compounds which contain basic groups, for example tertiary amino groups or quaternary ammonium groups, and especially those compounds of the formula II, are suitable for brightening materials of polyacrylonitrile or cellulose esters.

Coumarin compounds of the formula I which contain neither acid nor basic groups and as a result are sparingly soluble in water are suitable for brightening materials consisting of synthetic polycondensates, such as polyesters, polyamides and polyurethanes, and for brightening materials consisting of polyacrylonitrile, polystyrene or cellulose esters.

The optical brighteners of the present invention can be used in the usual manner, for example in the form of solutions in water or in organic solvents or in the form of aqueous dispersions, in which case dispersing agents which can be used are, inter alia, condensation products of naphthalenesulphonic acids and formaldehyde.

The brighteners can also be added to spinning compositions and casting compositions which are used for the production of fibres, filaments, films and other structures.

The amount of new whiteners to be used according to the invention, relative to the material to be whitened, can vary within wide limits. A significant durable effect can be achieved even with very small amounts, in certain cases, for example, with 0.001% by weight. However, it is also possible to use amounts of up to 0.5% by weight and more. For most practical purposes, amounts between 0.01 and 0.2% by weight are preferably of interest. The new compounds used as whiteners can also be employed, for example, as follows:

(a) as mixtures with dyestuffs or pigments or as an additive to dyebaths, printing pastes, discharge pastes or resist pastes, as well as for the after-treatment of dyeings, prints or discharge prints;

(b) as mixtures with so-called carriers, antioxidants, light stabilisers, heat stabilisers or chemical bleaching agents or as an additive to bleaching baths;

(c) as mixtures with crosslinking agents or finishing agents, such as starch or synthetically accessible finishing agents; and (d) in combination with washing agents.

The compounds of the formula mentioned at the outset can be used as scintillators for a variety of photographic purposes, such as for electrophotographic reproduction or for supersensitisation.

The compounds are also suitable as laser dyestuffs n the wavelength range from 400 to 480 nm when they are employed in a dyestuff laser apparatus pulsed by a nitrogen laser.

EXAMPLE 1

3 g of piperidine are added dropwise to a solution of 11.2 g (0.04 mol) of 4-[4'-methyl-5'-phenyl-1',2',3'-triazol-2'-yl]-salicylaldehyde and 10.9 g (0.045 mol) of ethyl 4-methylphenylsulphonylacetate in 200 ml of xylene. The reaction mixture is heated under reflux for 2-3 hours, and at the same time the water formed is distilled off azeotropically. The product which has separated out is filtered off, after cooling, and washed with methanol.

This gives 14.2 g (77.7% of theory) of light yellow crystals of the compound of the formula

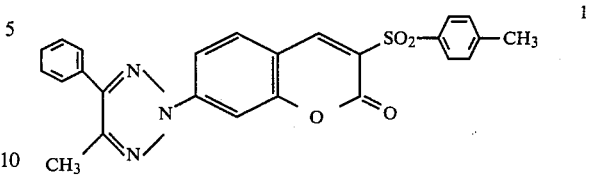

which, when recrystallised from toluene and dissolved in dimethylformamide, exhibit a very intense, blue fluorescence. When polyester fibre material is dyed with the compound by the high temperature exhaustion process, outstanding brightening effects are obtained.

The ethyl 4-methylphenylsulphonylacetate used as a starting material is prepared by heating sodium 4-methylphenylsulphinate and ethyl chloroacetate in ethanol under reflux. The substituted sulphonylacetic acids and sulphonylacetates used in the scope of this Patent Specification can also be prepared in the same manner.

The 4-[4'-methyl-5'-phenyl-1',2',3'-triazol-2'-yl]-salicylaldehyde can be prepared, for example, by reacting 4-(1',2',3'-triazol-2'-yl)-phenol with 1,1',3,3'-tetraphenyl-2,2'-biimidazolidinylidene and then hydrolysing the product to give the corresponding 2-imidazolidin-2-yl-phenol (see H. Giesecke and J. Hocker, Liebigs Ann. Chem. 1978, 345). The substituted triazolylsalicylaldehydes used within the scope of this Patent Specification can also be synthesised in the same manner.

If an equivalent amount of ethyl 4-chlorophenylsulphonylacetate is used instead of ethyl 4-methylphenylsulphonylacetate and the procedure is otherwise as described in Example 1, the compound of the formula

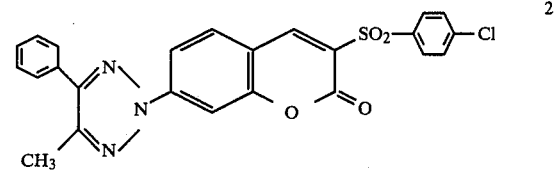

is obtained and is recrystallised from xylene/bleaching earth. When dissolved in dimethylformamide, it displays an intense, blue-violet fluorescence.

EXAMPLE 2

18.7 g (87% of theory) of the compound of the formula

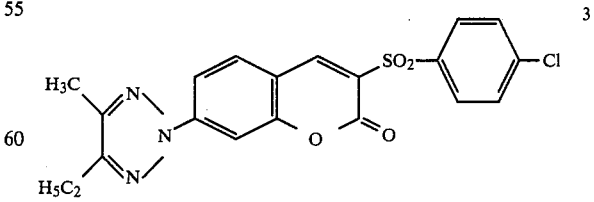

which can be purified from chlorobenzene with the aid of bleaching earth, are obtained analogously to Example 1 from 11.6 g (0.05 mol) of 4-(4'-methyl-5'-ethyl-1',2',3'-triazol-2'-yl)-salicylaldehyde and 13.1 g (0.05 mol) of ethyl 4-chlorophenylsulphonylacetate. When dissolved in dimethylformamide, this product displays an intense, red-violet fluorescence and produces brilliant whitening effects when used for dyeing polyester by the high temperature exhaustion process.

EXAMPLE 3

1 ml of piperidine is added dropwise to a solution of 11.2 g (0.04 mol) of 4-(4'-methyl-5'-phenyl-1',2',3'-triazol-2'-yl)-salicylaldehyde and 7.5 g (0.045 mol) of ethyl methylsulphonylacetate in 100 ml of ethanol. The mixture is heated under reflux for 3 hours and the reaction product which has separated out is filtered off and washed with ethanol. The compound obtained (12.8 g ≙ 84% of theory), of the formula

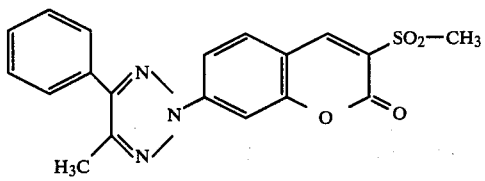
4 is recrystallised from 1,2-dichlorobenzene/bleaching earth and, when dissolved in dimethylformamide, displays a brilliant, blue fluorescence.

EXAMPLE 4

15.9 g (87.7% of theory) of the compound of the formula

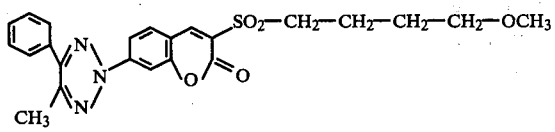
5 are obtained in the form of light yellow crystals, which are recrystallised from chlorobenzene/bleaching earth, in the same manner as indicated in Example 3, from 11.2 g (0.04 mol) of 4-(4'-methyl-5'-phenyl-1',2',3'-triazol-2'-yl)-salicylaldehyde and 9.8 g (0.04 mol) of ethyl 4-methoxybutylsulphonylacetate. When dissolved in dimethylformamide, the compound displays a brilliant, reddish-tinged blue fluorescence.

EXAMPLE 5

A mixture of 23.1 g (0.1 mol) of 4-(4'-methyl-5'-ethyl-1',2',3'-triazol-2'-yl)-salicylaldehyde, 9.8 g of anhydrous sodium acetate, 26.9 g (0.1 mol) of 3,4-dichlorophenylsulphonylacetic acid and 60 g of acetic anhydride is heated under reflux for 15 hours. It is cooled to about 70° C. and 50 ml of methanol are added. After cooling the mixture to 0° C., the product which has precipitated is filtered off and washed with methanol. This gives 32.5 g (63.4% of theory) of yellow crystals of the compound of the formula

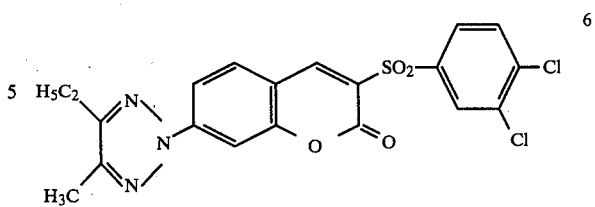
6 which are recrystallised from xylene/bleaching earth and, when dissolved in dimethylformamide, display an intense blue fluorescence.

25.5 g (51.2% of theory) of the compound of the formula

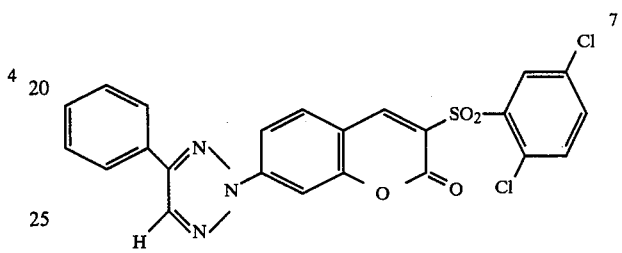
7 which is recrystallised from chlorobenzene/bleaching earth, are obtained in the same manner from 26.6 g (0.1 mol) of 4-(4'-phenyl-1',2',3'-triazol-2'-yl)-salicylaldehyde and 26.9 g (0.1 mol) of 2,5-dichlorophenylsulphonylacetic acid. The compound displays a blue fluorescence in dimethylformamide.

EXAMPLE 6

83.1 g (0.3 mol) of 4-benzenesulphonamidosalicylaldehyde, 72.6 g (0.3 mol) of ethyl 4-methylsulphonylacetate and 10 ml of piperidine are heated under reflux in 750 ml of ethanol for 3 hours. The mixture is cooled and the yellow precipitate which has separated out is filtered off. This gives 130 g (95% of theory) of the compound of the formula

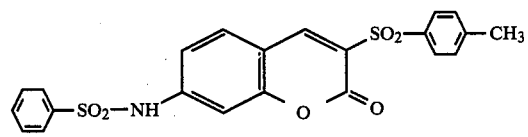
8 which can be recrystallised from acetonitrile.

58.9 g (0.13 mol) of 3-(4'-tolylsulphonyl)-7-benzenesulphonamidocoumarin are introduced into 150 g of 80% strength sulphuric acid at room temperature. The suspension is stirred at 90°–100° C. for 3 hours. It is cooled to 0° C. and 500 ml of water are added. Diazotisation is carried out at 0°–5° C. with a solution of 9 g (0.13 mol) of sodium nitrite in 40 ml of water. The suspension is subsequently stirred for 1 hour and is then allowed to run into a solution of 26.8 g (0.12 mol) of 2-aminonaphthalenesulphonic acid in 300 ml of water, which has been adjusted to pH 6 with concentrated sodium hydroxide solution, at 0°–5° C. in the course of 1.5 hours. A pH of 4.5–5 is maintained during the dropwise addition by adding sodium hydroxide solution. After subsequently stirring the mixture at 0° C. for 1 hour, the azo compound formed is filtered off, washed with water and suspended in 200 ml of pyridine. 100 g of copper-II acetate are added to the suspension and the mixture is stirred at 75°–80° C. for 45 minutes and cooled. The compound of the formula

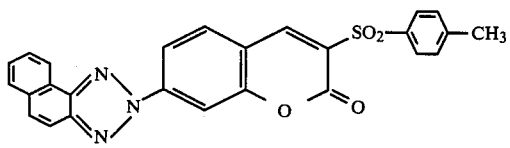             (9)

which has precipitated is filtered off and washed with water. This gives 38.5 g (63% of theory) of light yellow crystals which can be recrystallised from 1,2-dichlorobenzene. They display a blue-violet fluorescence in dimethylformamide.

If 3-methyl-4-methoxyaniline is reacted in the manner described above instead of 2-aminonaphthalenesulphonic acid, the compound of the formula

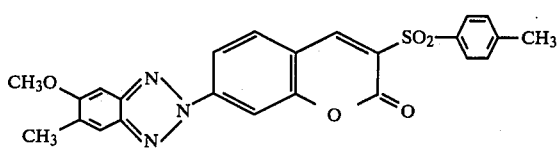             (10)

which, when dissolved in dimethylformamide, displays an intense blue fluorescence, is obtained. When polyester is dyed with the coumarin compound by the high temperature process in the presence of sodium chlorite, a good brightening effect is obtained.

EXAMPLE 7

1 ml of piperidine is added dropwise to a solution of 11.2 g (0.04 mol) of 4-(4′-methyl-5′-phenyl-1′,2′,3′-triazol-2′-yl)-salicylaldehyde and 8.3 g (0.04 mol) of ethyl chloromethylsulphonylacetate in 100 ml of ethanol. The mixture is heated under reflux for 3 hours and the reaction product which has separated out is filtered off and washed with ethanol. The resulting product (13.7 g ≙ 82% of theory) of the formula

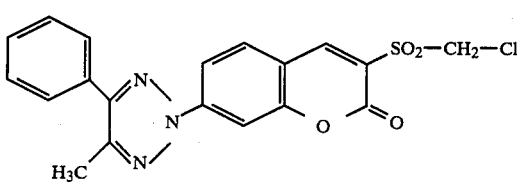             (11)

is recrystallised from chlorobenzene/bleaching earth and, when dissolved in dimethylformamide, displays a brilliant, blue fluorescence.

Reaction with triethylamine gives a cationic coumarin compound of the formula

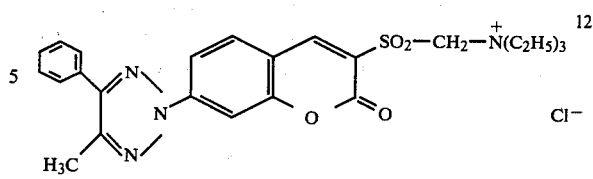             (12)

with which a very good brightening effect is obtained on polyacrylonitrile by the exhaustion process.

The compound of the formula

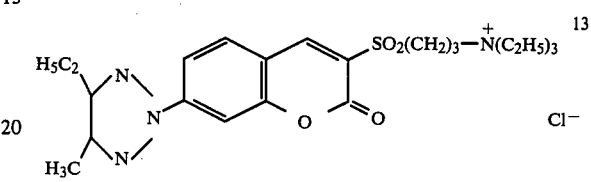             (13)

which likewise gives a very good lightening effect on polyacrylonitrile materials, is also obtained in the same manner as described above.

EXAMPLE 8

A mixture of 28 g (0.1 mol) of 4-(4′-methyl-5′-phenyl-1′,2′,3′-triazol-2′-yl)-salicylaldehyde, 9.8 g of anhydrous sodium acetate, 14 g (0.1 mol) of sulphoacetic acid and 60 g of acetic anhydride is heated under reflux for 24 hours. Most of the solvent is then distilled off in vacuo and methanol is added to the residue at 20° C. The product which has precipitated is filtered off and washed with methanol. This gives 19.5 g (43.6% of theory) of the sodium salt of the compound of the formula

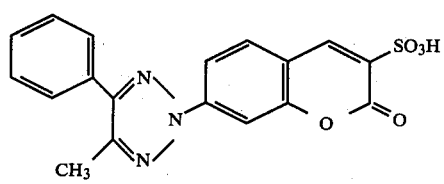             (14)

with which significant brightening effects are produced on wool and polyamide by the exhaustion process.

EXAMPLE 9

The following compounds of the formula

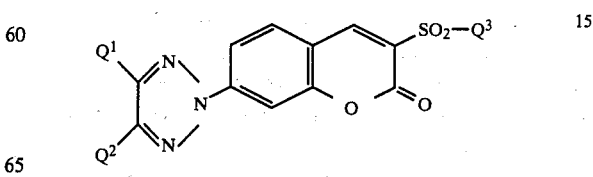             (15)

are also prepared by the processes described in Examples 1, 3, 5, 6, 7 and 8:

| Compound No. | Q¹ | Q² | Q³ | Colour of fluorescence in dimethyl-formamide |
|---|---|---|---|---|
| 16 | -C₆H₅ (phenyl) | CH₃ | -C₆H₅ (phenyl) | blue-violet |
| 17 | C₂H₅ | " | " | slightly reddish-tinged blue |
| 18 | -C₆H₅ (phenyl) | " | -C₆H₄-C₆H₅ (biphenyl) | blue |
| 19 | " | " | 2,4-dichlorophenyl | blue |
| 20 | " | " | 2,4-dichlorophenyl | intense blue |
| 21 | " | " | —CH₂—CH₂—CN | blue-violet |
| 22 | C₂H₅ | " | —CH₂—CH₂—OCH₃ | reddish-tinged blue |
| 23 | -C₆H₅ (phenyl) | " | —NH—(CH₂)₂—N⁺(C₂H₅)₃ Cl⁻ | neutral blue |
| 24 | C₂H₅ | " | —CH₂—CH₂—SO₃H | red-violet |
| 25 | " | " | —CH₂—C₆H₅ (benzyl) | intensely reddish-tinged blue |
| 26 | " | " | 2-methyl-3-chlorophenyl | red-violet |
| 27 | -C₆H₅ (phenyl) | H | —CH₂—CH₂—OH | blue |
| 28 | " | " | Cl—(CH₂)₄— | blue-violet |
| 29 | " | " | —(CH₂)₂NHCH₃ | reddish blue |
| 30 | —CH=CH—C₆H₅ | Cl | —CH₂—CH(CH₃)₂ | reddish-tinged blue |
| 31 | OCH₃ | H | Cl—CH₂—CH(OH)— | slightly reddish-tinged blue |
| 32 | OC₄H₉—n | " | —CH₂—CH₂—CN | blue |
| 33 | CH₃ | CH₃ | —CH₂—CH₂—O—C₂H₅ | reddish-tinged blue |
| 34 | C₂H₅OOC | H | —CH₂—N(morpholino) | neutral blue |
| 35 | 2,3-dichlorophenyl | CH₃ | | intense blue |
| 36 | -C₆H₅ (phenyl) | CN | —CH₂CH₂OCH₂—C₆H₅ | slightly greenish-tinged blue |
| 37 | CN | H | —CH₂CH₂—SO₃H | blue |
| 38 | C₂H₅ | CH₃ | —CH₂—CH=CH₂ | reddish-tinged blue |

EXAMPLE 39

150 g of sodium p-chlorophenyl-sulphinate (70.2% strength ≙ 105.3 g, 100% strength ≙ 0.53 mol) are heated with 87.7 g of ethyl bromoacetate in 2.8 l of ethanol to the boiling under reflux for 4 hours, 122.5 g of the sodium salt of 4-(4-methyl-5-phenyl-1,2,3-triazol-2-yl)-salicylaldehyde (98.3% strength ≙ 120.4 g, 100% strength ≙ 0.4 mol) and 24 g of glacial acetic acid are added successively and the suspension is stirred for 20 minutes. 15 ml of piperidine are then added and the mixture is heated to the boiling point, under reflux and whilst stirring, for 30 minutes and cooled. The crystalline precipitate is filtered off, washed with a total of 1 l of ethanol in several portions and with 2 l of water and dried at 80° C. in vacuo. This gives 162.4 g (85% of theory) of the compound of the formula
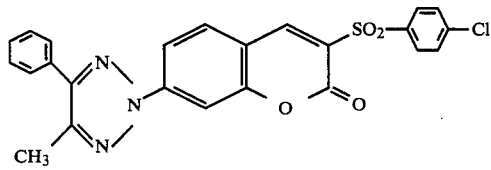
We claim:
1. A coumarin compound of the formula
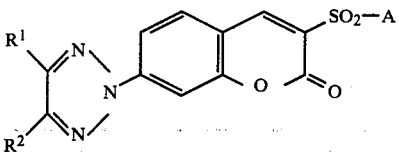
wherein
R¹ is $C_{1-2}$ alkyl or phenyl,
R² is hydrogen, methyl or chlorine, and
A is $C_{1-4}$-alkyl optionally substituted by Cl, CN or O—$C_{1-2}$-alkyl, or phenyl optionally substituted by phenyl, Cl or methyl.
2. A coumarin compound according to claim 1, of the formula
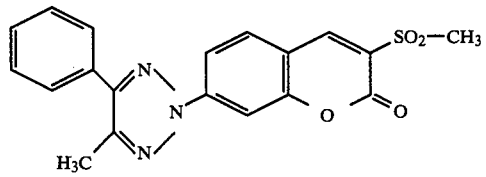
* * * * *